Patented Apr. 12, 1949

2,467,082

UNITED STATES PATENT OFFICE 2,467,082

METHOD OF PRODUCING CHALK

Louis C. Fleck, Menasha, Wis., assignor to Paper Patents Company, Neenah, Wis., a corporation of Wisconsin No Drawing. Application June 11, 1948, Serial No. 32,522

5 Claims. (Cl. 23—66)

The present invention relates to improvements in the manufacture of chalk and in particular to the manufacture of calcium carbonate pigments and fillers, which are of value for coating paper and the like.

For the purposes of this case the term "chalk" means a substance composed principally of calcium carbonate in the form of crystals of relatively small size.

The object of the present invention is to provide an economical process for manufacturing chalk, of the type used in industries such as paper making, in which the particles are of crystalline structure and are of a substantially uniform size and which have a maximum dimension of less than about 15 microns and preferably, for some uses, less than 3 microns.

In the paper industry, paper is coated or pigmented with small chalk crystals to increase the brightness and the whiteness of the sheet. Only chalk crystals of certain sizes may be used for such specialized purposes. Calcium carbonate crystallizes into several forms, the principal crystalline structures being aragonite and calcite. Aragonite crystals are orthorhombic or needle-like in shape, and the calcite crystals are stable rhombohedral structures having flat reflecting surfaces. Both types of crystals, when in the proper range of particle size, impart excellent brightness to paper sheets coated with the crystals.

The present invention is of especial value in the production of chalk by processes which treat a calcium hydroxide slurry with carbon dioxide. Although these carbonating processes have been practiced for many years in the manufacture of chalk, difficulties have been encountered in producing chalk having crystalline particles of small and uniform size. I have discovered that the presence of an extract made from sugar beet refining wastes inhibits the growth of calcium carbonate crystals which are precipitated from a calcium hydroxide slurry by carbonation.

In the manufacture of beet sugar, the sugar beets are sliced and the sugar and other dispersible and soluble organic and inorganic materials are extracted by circulating heated water through the beet slices in cookers. The aqueous solution or dispersion thus obtained contains in addition to the dissolved sugar, certain unwanted materials which cause coloring and prevent the efficient crystallization of the sugar. These unwanted compounds are known to include protein-like organic compounds and amino acid compounds, such as glutamic acid.

In order to remove the unwanted organic materials from the sugar solution, the sugar manufacturer treats the extracted beet juice with two to three per cent milk of lime, heats the mixture, and then passes carbon dioxide gas through the solution until a pH of about 11 is reached. The passage of carbon dioxide through the dispersion with the resulting formation of a precipitate of calcium carbonate and slaked lime coagulates a large portion of the dissolved and suspended organic materials to form a sludge. The sludge is filtered out, leaving a clear sugar solution. After a thorough washing with water the sugar-free filter cake is removed from the filter, broken up with water, and, according to the usual practice, is pumped to a sludge bed as waste.

General method

In the practice of the present invention sugar-free beet sugar filter sludge, containing calcium carbonate, slaked lime, and the coagulated organic materials, is treated with hot water and filtered to form an extract. The extract is added to a slurry of calcium hydroxide which is then carbonated. When the carbonation is effected in the presence of the extract, the crystals are found to be small and uniform and of a size within the proper range for coating paper. The sludge on the dry basis, used in making the extract, should represent from one to ten per cent of the weight of the final batch in which the crystals are formed, for a batch containing about 10 to 15% of lime (CaO).

It is sometimes desirable, if the coloring matter remaining in the extract is excessive, to bleach the slurry with a bleaching agent such as chlorine or calcium hypochlorite. Excess bleach may be neutralized by treating the solution with sulfur dioxide water, if chlorine was used, and any calcium chloride formed by the bleach may be removed by adding a small amount of sodium carbonate.

Specific example

The wet, sugar-free beet residue sludge containing 50% solids is mixed with water, using 540 parts by weight of the wet sludge to 800 parts by weight of water. The mixture, if too alkaline, is then carbonated by injecting $CO_2$ at a temperature of 65° C. until the pH of the suspension is about 9.2. The solid materials are filtered out. The clear liquid remaining contains the extract, which inhibits the growth of the crystals and, incidentally, contains the residual coloring matter from the sugar beets.

The temperatures employed in preparing the sludge extract are not restricted to the temperatures given in the above example, but may vary from about 55–80° C. The pH during the extraction is not critical but is preferably within the range of 7.5–9.5, depending upon the composition of the specific residue used. The ratio of beet residue to water in forming the dispersion may be varied over a wide range in accordance with conditions, but for efficient extraction a rather heavy suspension should be used.

The slurry from which the chalk is precipitated is made by suspending 150 parts of quick lime in 1,000 parts of clear water, and to this mixture is added from 300 to 700, preferably 500 parts, of the extract prepared as above described. The resulting mixture is mechanically agitated and treated with 24 parts of calcium hypochlorite at a temperature of 70° C. in order to remove the residual beet coloring matter from the batch. With continued agitation the batch is carbonated, also at a temperature of about 70° C., to a pH of about 7.8 where a calcium carbonate precipitate appears. Sufficient sulfur dioxide water is then added to destroy any unreacted bleaching compound. Three parts of sodium carbonate are then added to convert any calcium chloride formed during the bleaching period to calcium carbonate. The calcium carbonate chalk crystals formed in the suspension are fine enough to remain in suspension for over 24 hours.

The temperature at which the precipitation of the chalk may occur ranges from 20°–75° C., but the preferred range is from 60°–70° C. At lower temperatures thickening occurs upon carbonation and the precipitated chalk crystals are difficult to de-water. At the higher temperatures the slurry remains thin, bleaching is facilitated, and no serious difficulties are encountered in handling the precipitated materials. The pH of 7.8 at which precipitation occurred is merely an approximate figure for indicating the end point of carbonation. Slightly more carbonation may be needed to precipitate the chalk, depending upon the temperature, and upon the degree of saturation of the slurry; but over carbonation should be avoided because the formation of the bicarbonate greatly increases the solubility of the calcium carbonate.

The chalk crystals which are filtered out of the suspension have a maximum dimension of about 8 microns. The crystals are unusually white and their brightness, when measured on a reflectance meter, measure 96.6. The brightness value referred to was obtained by the use of the General Electric Reflectance Meter with a No. 1 or brightness filter as is used almost exclusively for making comparative brightness tests in the paper industry.

A paper coating was made from a mixture of 50 per cent chalk crystals prepared as above set forth and 50 per cent Georgia kaolin clay. This coating was compared with one composed of 50 per cent commercial high grade chalk (prepared from the reaction of calcium chloride with sodium carbonate) and 50 per cent Georgia kaolin clay. A ten pound coat per side per ream (3,000 square feet) of each coating material was applied respectively to each of two identical all bleached pulp furnish paper sheets, and the two papers were compared for brightness. The coating composed of the sludge extract chalk gave a brightness of 82.0, whereas the commercial chalk coating exhibited a brightness of 81.1. The paper sheet coated with chalk crystals prepared in accordance with the invention was then subjected to a 12 hour ultraviolet ray exposure in a fadometer, and no fading was exhibited by the sheet.

It has been found that the extract prepared by carbonating a sugar beet residue suspension and then filtering out the solid materials as described above apparently cannot be used to slake lime in the usual way. Even though the extract is composed principally of water, it appears that the chemical substances in the extract retard hydration of the lime. A similar reaction may occur in the calcium hydroxide slurry, preventing the growth of calcium carbonate crystals after they are formed and thus controlling the particle size. Another effect resulting from the addition of the beet residue extract appears to be an increase in the water adsorptive powers of the chalk crystals.

In the prior known processes for precipitating chalk crystals the temperature should be carefully controlled so as to prevent the formation of undesirable crystals. The addition of the sludge extract insures uniform small, chalk crystals at temperatures well over 50° C., thus allowing greater flexibility in the control elements of the process.

The carbonation process described above may be carried out employing standard equipment known in the art to effect the various reactions as set forth above. It will be understood that the concentrations of the solution and pH values set forth may be varied without departing from the principles and the scope of the invention.

This application is a continuation in part of my prior application Serial No. 719,921, now abandoned, which was filed on January 2, 1947, and which was assigned to the assignee of the present invention.

Various of the features of my invention that are believed to be new are set forth in the appended claims.

I claim:

1. A method of producing chalk, which comprises carbonating an aqueous calcium hydroxide slurry in the presence of sugar beet residue extract.

2. A method for producing chalk having a maximum particle size of 15 microns, and of particular use as a coating material for paper and the like, which comprises carbonating an aqueous calcium hydroxide slurry in the presence of sugar beet residue extract until chalk crystals are formed, and separating the suspended crystals from the liquid.

3. A method for producing chalk having a maximum particle size of 15 microns, and of particular use as a coating material for paper and the like, which comprises suspending lime in water to make a slurry, adding sugar beet residue extract to the slurry, adding a bleaching agent, carbonating the batch at 20°–75° C. until chalk crystals are formed, and separating the suspended crystals from the liquid.

4. A method for producing chalk having a maximum particle size of 15 microns, and of particular use as a coating material for paper and the like, which comprises suspending lime in water to make a slurry, adding to the slurry the extract prepared from an amount of sugar beet residue sludge representing, on the dry basis, one to ten per cent of the weight of the total batch, adding a bleaching agent, carbonating the batch at 20°–75° C. until chalk crystals are formed, adding a substance to destroy the unreacted bleaching agent, and separating the suspended crystals from the liquid.

5. A method for producing chalk having a maximum particle size of 15 microns, and for particular use as a coating material for paper and the like, which comprises suspending lime in water to make a batch of slurry, adding to the slurry the extract prepared from an amount of sugar beet residue representing, on the dry basis, about 6% of the weight of the batch of slurry, adding calcium hypochlorite bleaching agent to the mixture, carbonating the batch at 20°–75° C. until chalk crystals are formed, adding sulfur dioxide water to destroy the unreacted bleaching agent, adding a small but useful amount of sodium carbonate so as to convert any residual calcium chloride to calcium carbonate, and separating the suspended crystals from the liquid.

LOUIS C. FLECK.

No references cited.